Figure 1:
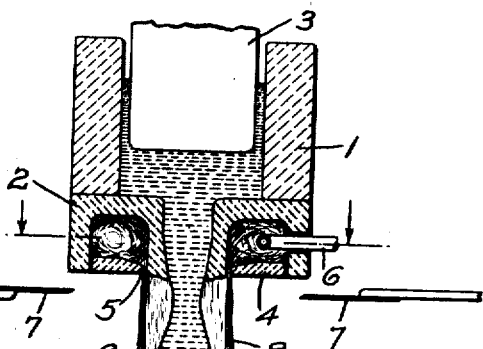

K. E. PEILER.
GLASS WORKING.
APPLICATION FILED OCT. 22, 1917.

1,401,922.

Patented Dec. 27, 1921.

Witness:
S. S. Grotta

Inventor:
Karl E. Peiler
by Wm H Honiss
Atty.

UNITED STATES PATENT OFFICE.

KARL E. PEILER, OF WEST HARTFORD, CONNECTICUT, ASSIGNOR TO HARTFORD-FAIRMONT COMPANY, OF CANAJOHARIE, NEW YORK, A CORPORATION OF NEW YORK.

GLASS-WORKING.

1,401,922.  Specification of Letters Patent.  Patented Dec. 27, 1921.

Application filed October 22, 1917. Serial No. 197,751.

*To all whom it may concern:*

Be it known that I, KARL E. PEILER, a citizen of the United States, residing at West Hartford, in the county of Hartford and State of Connecticut, have invented new and useful Improvements in Glass-Working, of which the following is a specification.

This invention relates to a method of and means for treating molten glass while being fed or discharged from the forehearth or outlet of a melting furnace or other container of molten glass, to conserve the heat of the glass and thus temporarily maintain it in more suitable condition for subsequent shaping into articles of glassware, and especially to minimize the extreme and immediate loss of heat, due to its emergence from the intense heat of a melting furnace into an outer temperature several hundred degrees lower, which causes the glass to radiate heat rapidly and sometimes unevenly on different sides, with a consequent lessening and irregularity of its plasticity which affects its subsequent shaping into glassware. This has hitherto been remedied by constructing inclosing shields or housings around the discharge outlets of melting furnaces and other containers from which molten glass is delivered, to protect the charges from the external chilling effect, and in some instances heating flames are projected into these inclosing structures so as to heat their interior and further reduce the radiation of heat from the molten glass, as is shown and described in my prior application Serial No. 823,694, filed March 10, 1914, and therefore no claims thereon are made herein.

The objections to these inclosing structures are their added expense, the fact that they are opaque and prevent observation of the flowing glass or of the forming gather; also that it is necessary to provide apertures of fair size for the entrance of the shears or other means employed for severing the glass, thus making it necessary to arrange the severing means and the apertures therefor in predetermined locations.

Another known method of conserving the heat of the glass, or to locally reheat it, is to project flames of gas or oil directly against the gathers. Objection to this impinging flame method has been made that carbon particles and bubbles of gas will be driven into the glass, thus causing blisters and other imperfections in the glassware formed therefrom.

The object of the present invention is to provide a simple, inexpensive and very efficient method of and means for conserving the heat of the flowing glass, or of the gathers or drops, as they issue from the furnace outlet, eliminating the need of a structural confining shield or housing about the discharge outlet, thus enabling the glass to be easily observed as it flows and is formed in drops and severed and also avoiding the objections, above noted, to the methods in which heating flames are made to impinge directly against the glass or the gathers.

This object is attained by surrounding the molten glass as it comes from the outlet spout of the furnace or container partly or wholly with an unconfined curtain of flame substantially out of driving or penetrating contact with the surface of the inclosed glass; and this is accomplished by arranging a burner or burners in such a manner that the flame curtain will be projected in the desired relation around the glass as it issues from the outlet, passes below the plane of severance, and is severed into charges or gathers.

Figure 2:
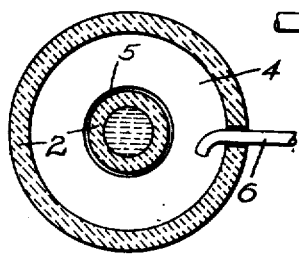
Figure 4:
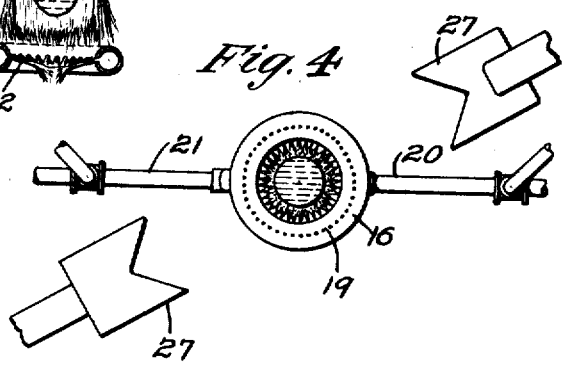
Figure 3:
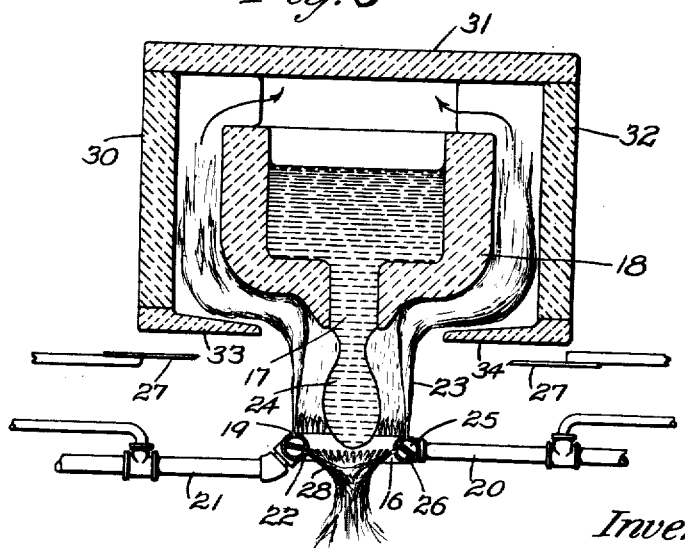

Figure 1 of the accompanying drawings shows in elevation a central vertical section of one embodiment of my present invention. Fig. 2 is a plan view in section taken on the line 2—2 of Fig. 1. Fig. 3 shows in elevation a central vertical section of a modified embodiment of the invention. Fig. 4 is a plan view of the gas burner, and of the shear blades for severing the charge of glass, illustrated in Fig. 3.

The forehearth 1 of the melting furnace or container for molten glass is or may be of the ordinary construction. The spout 2 illustrated herein has a discharge outlet in its bottom wall, and a plunger 3 or other impelling or regulating means may be provided for facilitating or regulating the flow of molten glass from the discharge outlet in any of several well-known ways. The spout structure 2 forms an annular burner encircling the discharge outlet and closed by the annular plate 4, leaving a circular slot 5 or other suitable gas openings through its lower wall. The burner is connected by a pipe 6 with any suitable and convenient supply of a mixture of air and gas for producing the necessary flame. The gas discharging openings in this burner are arranged so as to project the gas flame downwardly and around the drop 9 or flow of molten glass that is emerging from the outlet, in order to inclose all or a substantial portion of the gather with an annular or approximately cylindrical curtain 8 of flame. The curtain of flame extends in a direction approximately parallel with the direction of flow of the glass, to protect the vertical sides of the gather or flow, or at least the principal mass thereof, from the sudden cooling effect of the surrounding external atmosphere, and sufficiently out of contact with the glass to avoid impingement of the flame against the surface of the glass to an extent which would charge its surface with bubbles of gas or air or with particles of carbon.

Provision is also made for inclosing the end of the cylindrical curtain below the gather. This preferably consists of a circular burner 10 supplied through the inlet pipe 11 with a suitable mixture of air and gas. The pipe is provided with the customary valves for regulating the mixture of gas and air, and for regulating the extent of the flame, or shutting it off altogether as and when desired. The burner is provided with suitable slots or perforations for projecting its flames radially inward and preferably slightly downward so as to produce a flame curtain 12 closing the lower end of the cylindrical curtain 8, and thus effecting the substantially complete inclosing of the gather.

Suitable shear blades 7 are provided for severing the gather when formed. The blades here shown have V-shaped cutting edges forming what is known in the glass working art as the "cats-eye" type of shears. Any suitable shears or other severing devices may, however, be employed, and may be disposed in any desired relation to the outlet, since they may pass freely through any portion of the inclosing curtain of flame. The blades may be operated by any of several well-known devices, and when operated are rapidly projected through the flame curtain far enough to sever the gathers and are then quickly retracted to their open position outside of the flame curtain, where they rest during the relatively long intervals between their cutting operations, and may be cooled during those intervals by jets of air or water, in various well known ways.

In the arrangement shown in Figs. 3 and 4 an annular burner 16 is located a substantial distance below the discharge outlet 17 of the spout or forehearth 18, and the gas openings 19 in this burner are arranged around the top so as to project the flames upwardly in an annular curtain 23 surrounding and clearing the drop 24, and also passing outside of the outlet spout 18. In this form the outer side of the wall of the spout is shown to be so formed that the upwardly projected gas flames will be deflected outwardly around the spout; and the latter may be inclosed by outer walls 30, 31, 32, 33 and 34, leaving between them and the spout and forehearth flue spaces for the passage of the flames and their products of combustion to or toward the interior of the furnace, so as to inclose and substantially confine their heat to the wall of the discharge outlet and the forehearth.

If desired, the burner 16 may be partitioned into two annular gas chambers 25 and 26, supplied by separate pipes 20 and 21, so that the gas flames from these chambers may be separately regulated or shut off. The lower chamber is provided with openings 22 arranged to project its jets of flame 28 radially inward below the drop, as in the case of the burner 10 of Fig. 1. Or a separate burner like that of Fig. 1 may be employed for the bottom curtain.

Shear blades 27 like those of Fig. 1 may be employed as described in connection with that figure, for severing the glass charges.

In operating this device the character and extent of the flame curtains employed are regulated to suit the requirements or conditions of use.

When the glass is fed in the form of a suspended gather as shown in Figs. 1 and 2, and thus accumulated until a compact charge of the required size has been formed, the lower curtain flame may be left burning at least during the formation of the charge, and possibly during the entire operation, including the period during which the severed gather is falling through the lower flame. If, however, it should be found that bubbles of gas or carbon particles result from the lower flame impinging upon the gather while falling through the flame, the lower burner may be closed or nearly closed while the glass is falling through and may be reopened immediately after. This opening and closing of the valve may be automatically performed, being synchronized with the opening and closing movements of the shear blades.

The sizes proportions and disposal of the spout, burner, and other parts should be adapted to each other and to the size of the drop or gather to be produced, all of this being within the skill of the glass worker.

The invention claimed is:—

1. The method of conserving the heat of molten glass flowing from a container and successively severed into charges, which consists in inclosing the vertical sides of the flowing glass below the plane of severance of the charges with an unconfined flame curtain substantially out of contact with the glass.

2. The method of conserving the heat of molten glass flowing from a container and successively severed into charges, which consists in directing an unconfined flame about and substantially out of contact with the flowing glass, forming a curtain of flame therefor below the plane of severance during the formation of a charge.

3. The method of conserving the heat of molten glass flowing from the outlet of a glass container to be severed into mold charges, which consists in providing an unconfined curtain of flame substantially out of contact with the glass below the plane of severance thereof and during the formation of a charge, the said curtain extending substantially around the glass substantially parallel with its direction of flow.

4. The method of conserving the heat of molten glass flowing from the outlet of a glass container to be severed into mold charges, which consists in projecting upwardly an unconfined flame extending around and substantially out of contact with the flowing glass below the plane of severance in the form of a curtain substantially inclosing the flowing glass during the formation of a charge.

5. The method of producing charges of molten glass, which consists in flowing and accumulating the charges at a flow outlet, providing an unconfined flame curtain substantially inclosing and substantially out of contact with the accumulated charges below the plane of severance during their formation, and severing the charges.

6. The method of forming and severing charges of molten glass while conserving the heat of the glass, which consists in flowing the glass within a surrounding unconfined flame curtain substantially out of contact with, and severing charges of the glass therefrom by projecting severing means through the flame curtain and into the glass.

7. The method of flowing charges of molten glass and severing charges therefrom while conserving the heat of the glass and minimizing the heating of the severing means, which consists in flowing the glass within an unconfined inclosing flame curtain which surrounds the glass and is substantially out of contact therewith at and below the plane of severance, projecting the severing means into the glass and retracting the severing means outside of the flame curtain.

8. The method of conserving the heat of charges of molten glass flowing from a container, which consists in projecting a flame curtain across the end of the gather, and substantially out of contact therewith.

9. The method of conserving the heat of charges of molten glass flowing from a container, which consists in projecting curtains of flame to substantially inclose the sides and end of the gather with an envelop of flame substantially out of contact with the gather.

10. The combination with a container for molten glass having an outlet for discharging the glass, of means for severing the glass into charges, and means for providing an unconfined curtain of flame substantially out of contact with the glass below the severing plane and inclosing the glass discharging from the outlet during the formation of a charge.

11. The combination with a container for molten glass having an outlet discharging the glass, of means for severing the discharging glass into mold charges, and means for projecting an unconfined inclosing curtain of flame around said outlet and below the plane of severance, to surround the charges of glass and substantially out of contact therewith while discharging from the outlet.

12. The combination with a container for molten glass, having an outlet for flowing the glass, means for severing the glass into charges, and means for projecting an unconfined inclosing curtain of flame around and substantially out of contact with the flowing glass below the plane of severance and substantially parallel with the direction of flow of the glass during the formation of the respective charges.

13. The combination with a container for molten glass, having an outlet for discharging gathers of the glass of means for severing the gathers from the outlet, and an annular burner disposed adjacent to the said outlet, and provided with openings for projecting jets of flame extending around the gathers, and substantially out of contact therewith toward and beyond the plane of severance during the discharging period.

14. The combination with a container for molten glass having an outlet for discharging and suspending gathers of the glass in a visible and accessible position, of an annular burner disposed adjacent to the said outlet, and provided with openings for projecting jets of flame around and substantially out of contact with the suspended gathers and joining the wall of the container.

15. The combination with means for flowing and accumulating suspended charges of molten glass, of means for projecting curtains of flame substantially parallel with the direction of flow of the gather, and also across the pathway of the gather and substantially out of contact therewith.

16. The combination with means for flowing, accumulating and severing successively suspended charges of molten glass, of burner devices provided with openings for projecting jets of flame to substantially inclose the vertical sides of the gather, while suspended, with an unconfined curtain of flame extending toward and beyond the plane of severance and substantially out of contact with the glass.

17. The combination with means for flowing and accumulating suspended charges of molten glass, of burner devices provided with openings for projecting jets of flame to substantially envelop the entire gather with a curtain of flame substantially out of contact with the charges while suspended.

18. The combination with a container for molten glass having an outlet for discharging the glass, of means for projecting a curtain of flame enveloping the glass and out of contact therewith, and severing devices arranged to be projected through the curtain to sever the glass and to be withdrawn therefrom.

19. The combination with means for flowing and accumulating suspended charges of molten glass, of means for projecting an unconfined substantially cylindrical envelop of flame around the gather in a direction substantially parallel with the direction of flow of the gather, and means for projecting a curtain of flame across the pathway of the charge below its end, substantially inclosing the gather on all sides.

20. The combination with a container for molten glass having an outlet for discharging the glass, of means for projecting an unconfined curtain of flame inclosing and substantially out of contact with the sides of the glass, and severing devices arranged to be projected through the curtain to sever the glass and to be withdrawn therefrom.

21. The combination with a container for molten glass having an outlet for discharging the glass, of an annular burner provided with openings for projecting jets of flame to form a flame curtain around and substantially out of contact with the glass flowing from the outlet, severing devices arranged to be projected through the flame curtain to sever the glass and to be withdrawn from the flame curtain during the intervals between severing operations.

Signed at Hartford, Connecticut, this 20th day of October, 1917.

KARL E. PEILER.

Certificate of Correction.

It is hereby certified that in Letters Patent No. 1,401,922, granted December 27, 1921, upon the application of Karl E. Peiler, of West Hartford, Connecticut, for an improvement in "Glass-Working," errors appear in the printed specification requiring correction as follows: Page 2, line 8, for the word "The" read *This;* page 3, line 25, claim 4, for "ffowing" read *flowing;* same page, line 42, claim 6, for the word "with" read *therewith;* and that the said Letters Patent should be read with these corrections therein that the same may conform to the record of the case in the Patent Office.

Signed and sealed this 14th day of February, A. D., 1922.

[SEAL.]

KARL FENNING,

*Acting Commissioner of Patents.*